United States Patent
Wang et al.

(10) Patent No.: US 8,383,751 B2
(45) Date of Patent: Feb. 26, 2013

(54) HIGH MELT STRENGTH POLYSTYRENE AND METHODS OF MAKING SAME

(75) Inventors: Wei Wang, League City, TX (US); David Knoeppel, League City, TX (US)

(73) Assignee: Fina Technology, Inc., Houston, TX (US)

(*) Notice: Subject to any disclaimer, the term of this patent is extended or adjusted under 35 U.S.C. 154(b) by 0 days.

(21) Appl. No.: 13/171,823

(22) Filed: Jun. 29, 2011

(65) Prior Publication Data

US 2013/0005912 A1    Jan. 3, 2013

(51) Int. Cl.
| | |
|---|---|
| C08F 18/00 | (2006.01) |
| C08F 20/68 | (2006.01) |
| C08F 220/12 | (2006.01) |
| C08L 25/02 | (2006.01) |
| C08L 33/02 | (2006.01) |
| C08L 35/02 | (2006.01) |
| C08L 39/04 | (2006.01) |

(52) U.S. Cl. ............ 526/320; 526/329.2; 525/203; 525/221; 525/222; 525/241

(58) Field of Classification Search ......... 526/320, 526/329.2; 525/203, 221, 222, 241
See application file for complete search history.

(56) References Cited

U.S. PATENT DOCUMENTS

| | | | |
|---|---|---|---|
| 5,268,438 A * | 12/1993 | Carson et al. | 526/273 |
| 5,540,410 A | 7/1996 | Lust et al. | |
| 2003/0134944 A1 | 7/2003 | Sethuraman et al. | |
| 2008/0301883 A1 | 12/2008 | Penninger | |
| 2009/0221756 A1 | 9/2009 | Bzducha | |

* cited by examiner

*Primary Examiner* — Nathan M Nutter

(57) ABSTRACT

A method of making a styrenic composition having a high melt strength including combining a styrenic monomer and a second monomer to form a combined mixture and subjecting the combined mixture to polymerization to obtain a styrenic co-polymer, wherein the second monomer comprises a hydroxyl functional group and wherein the styrenic composition has a greater melt strength than that of general purpose polystyrene.

15 Claims, 6 Drawing Sheets

HIGH MELT STRENGTH POLYSTYRENE AND METHODS OF MAKING SAME

CROSS-REFERENCE TO RELATED APPLICATIONS

Not applicable.

FIELD

The present invention is generally related to polymeric compositions. More specifically, the present invention is related to polystyrene compositions.

BACKGROUND

Styrene, also known, as vinyl benzene, is an aromatic compound that is produced in industrial quantities from ethylbenzene. The most common method of styrene production comprises the dehydrogenation of ethylbenzene, which produces a crude product of styrene and ethylbenzene. Polystyrene is an aromatic polymer produced from styrene monomer. Polystyrene is a widely used polymer found in insulation, packaging, and disposable cutlery, as well as foamed products including foam cups.

In preparing polystyrene, it may be desirable to initiate or increase the branching of polymer chains. Increased branching may impart physical property changes to the polymer including increased strength, higher temperature performance, and improved hardness. Additionally, increased branching may improve properties such as elastomeric performance and abrasion resistance.

Styrene monomer (SM) is often processed into many types of products, such as general purpose polystyrene (GPPS), high impact polystyrene (HIPS), transparent impact polystyrene (TIPS), and polystyrene foam. Many conditions affect the properties of the resulting product, including processing time, temperature, pressure, purity of the monomer feedstock, and the presence of additives or other compounds. These and other processing conditions alter the physical and chemical properties of the polystyrene product, affecting the suitability for a desired use.

Among the properties that must be controlled and balanced are averaged molecular weight (Mw) of the polymer, molecular weight distribution (MWD), melt flow index (MFI), the storage modulus (G'), the glass transition temperature (Tg), tensile strength, hardness, and toughness. Polystyrene typically reacts with hydrocarbon solvents and fats or oils, thus polystyrene may be blended or layered with another compound, or coated to limit this reactivity.

Melt strength is an important material property for thermoplastic processing. General-purpose polystyrene (GPPS), due to its generally linear molecular structure, has poor melt strength and demonstrates poor results in certain applications, such as in the production of films. Also, polystyrene foam is a useful form of polystyrene and polymer melt strength is an element for a foaming process. In the production of polystyrene foam, poor melt strength often leads to immature bubble breakage/coalescence, non-uniform cell morphology, and excessive open cell content. It would be desirable to obtain a polystyrene having a good melt strength in order to obtain polystyrene compositions that perform well in foaming processes and in the production of films.

SUMMARY

An embodiment of the present composition, either by itself or in combination with other embodiments of the composition, is a high melt strength polystyrene composition that includes a styrenic co-polymer resulting from the polymerization of at least one styrene monomer and at least one comonomer. The polystyrene composition has a melt strength greater than that of general purpose polystyrene, and in an embodiment the melt strength is at least 0.04 N.

The comonomer contains a hydroxyl functional group, is present in the styrenic composition in amounts ranging from 0.1 to 10 wt % based on the total weight of the styrenic composition, and can be selected from the group of hydroxyethylmethacrylate (HEMA), caprolactone acrylate, and combinations thereof.

The composition can have a z-average molecular weight ranging from 500,000 to 1,150,000.

An embodiment of the present invention, either by itself or in combination with other embodiments, is articles of manufacture made using the high melt strength polystyrene composition that is disclosed herein.

An embodiment of the present invention, either by itself or in combination with other embodiments of the invention, is a method of making a styrenic composition having an improved melt strength. The method includes combining a first monomer and a second monomer to form a combined mixture and subjecting the combined mixture to polymerization to obtain a styrenic co-polymer. The first monomer is a styrenic monomer and the second monomer includes a hydroxyl functional group. The styrenic co-polymer can have a melt strength of at least 0.04 N.

The first monomer can be selected from the group of styrene, α-methyl styrene, vinyl toluene, p-methyl styrene, t-butyl styrene, o-chlorostyrene, and vinyl pyridine and any combinations thereof, and can be present in the combined mixture in amounts ranging from 50 to 99.9 wt % based on the total weight of the combined mixture.

The second monomer can be selected from the group of hydroxyethylmethacrylate (HEMA), caprolactone acrylate, and combinations thereof, and can be present in the combined mixture in amounts ranging from 0.1 to 10 wt % based on the total weight of the combined mixture.

The method can further include admixing a polar additive with the styrenic co-polymer to form a styrenic composition. The polar additive can be selected from the group consisting of styrene-maleic anhydride polymers, poly(1,4-butylene adipate), polyethylene glycol, polyesters, polyethers, and combinations thereof. The polar additive can be present in amounts ranging from 0.1 to 5 wt % based on the total weight of the styrenic composition.

An embodiment of the present method, either by itself or in combination with other embodiments, is a method of improving the melt strength of a styrenic polymer that includes combining a styrenic monomer and a comonomer having a hydroxyl functional group to form a combined mixture and subjecting the combined mixture to polymerization to obtain a styrenic co-polymer. The comonomer has a hydroxyl functional group present in amounts sufficient to provide the styrenic co-polymer a melt strength greater than that of general purpose polystyrene, optionally at least 0.03 N. The styrenic co-polymer has a glass transition temperature of less than 105° C.

The styrenic monomer can be selected from the group of styrene, α-methyl styrene, vinyl toluene, p-methyl styrene, t-butyl styrene, o-chlorostyrene, and vinyl pyridine and any combinations thereof.

The comonomer having a hydroxyl functional group can be added to the combined mixture in amounts ranging from 1 to 10 wt % based on the total weight of the combined mixture and can be selected from the group of hydroxyethylmethacrylate (HEMA), caprolactone acrylate, and combinations thereof.

The embodiments disclosed herein are usable and combinable with every other embodiment disclosed herein, and consequently, this disclosure is enabling for any and all combinations of the embodiments disclosed herein.

DETAILED DESCRIPTION

Figure 1:
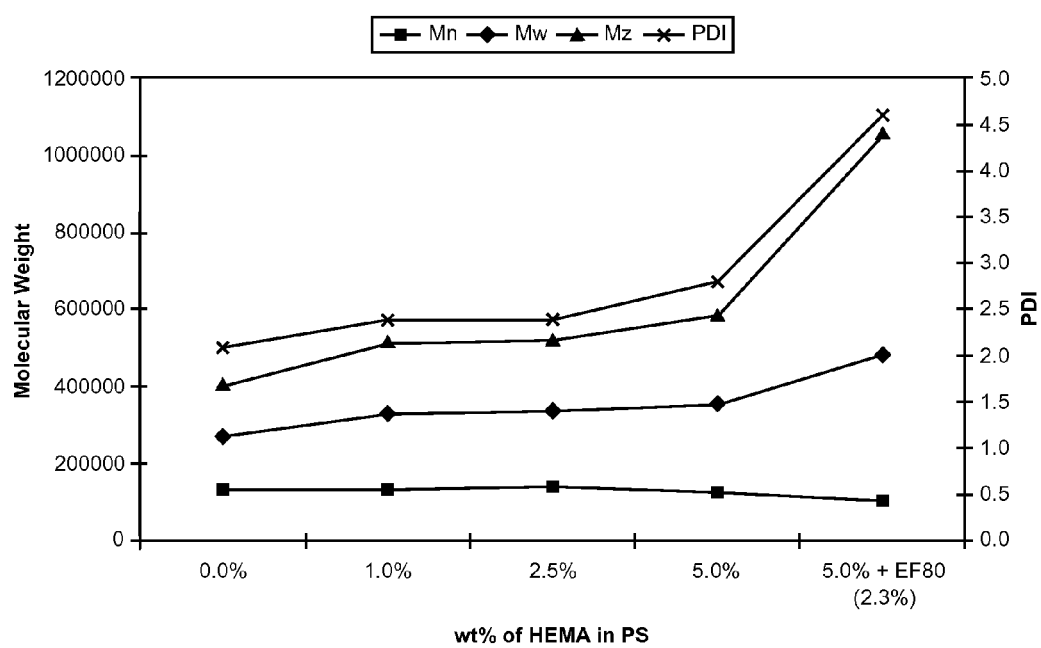
FIG. 1 is a graph illustrating the effect of hydroxyethylmethacrylate (HEMA) concentration on polystyrene molecular weight

The present disclosure includes methods of making a styrenic polymer composition having an improved melt strength. In an embodiment, the methods of making a styrenic polymer composition having an improved melt strength include co-polymerizing a styrenic component with co-monomers, wherein the co-monomers are hydroxyl functional vinyl co-monomers. In another embodiment, the methods of making a styrenic polymer having an improved melt strength include copolymerizing a styrenic component with co-monomers and a polar additive, wherein the co-monomers include a hydroxyl functional vinyl co-monomer. In a further embodiment, the present invention includes a styrenic copolymer having improved melt strength.

In an embodiment, the presently disclosed composition includes a styrenic polymer. In another embodiment, the styrenic polymer includes polymers of monovinylaromatic compounds, such as styrene, α-methyl styrene and ring-substituted styrenes. In an alternative embodiment, the styrenic polymer includes a homopolymer and/or copolymer of polystyrene. In an even further embodiment, styrenic monomers for use in the styrenic polymer composition can be selected from the group of styrene, α-methyl styrene, vinyl toluene, p-methyl styrene, t-butyl styrene, o-chlorostyrene, vinyl pyridine, and any combinations thereof. The styrenic polymeric component in the presently disclosed composition can be produced by any known process. In an embodiment, the styrenic polymer is polystyrene.

The presently disclosed composition may contain any desired amounts of a styrenic polymer. In an embodiment, the composition contains at least 50 wt % of a styrenic polymer. In another embodiment, the composition contains a styrenic polymer in amounts ranging from 1 to 100 wt %, 50 to 99.9 wt %, 75 to 99 wt %, and optionally 85 to 95 wt %. In a further embodiment, the composition contains a styrene polymer in amounts ranging from 90 to 99.9 wt %. In an even further embodiment, the composition contains a styrenic polymer in amounts ranging from 95 to 99 wt %.

The styrenic polymer of the presently disclosed composition may be a styrenic copolymer. The styrenic polymer of the presently disclosed composition may be formed by co-polymerizing a first monomer with a second monomer. The first monomer may include monovinylaromatic compounds, such as styrene, α-methyl styrene and ring-substituted styrenes. In an embodiment, the first monomer is selected from the group of styrene, α-methyl styrene, vinyl toluene, p-methyl styrene, t-butyl styrene, o-chlorostyrene, vinyl pyridine, and any combinations thereof. In another embodiment, styrene is the first monomer.

The first monomer may be present in the styrenic polymer in any desired amounts. In an embodiment, the first monomer is present in the styrenic polymer in amounts of at least 50 wt % of the styrenic polymer. In another embodiment, the first monomer is present in the styrenic polymer in amounts ranging from 90 to 99.9 wt % of the styrenic polymer. In a further embodiment, the first monomer is present in the styrenic polymer in amounts ranging from 95 to 99 wt %.

The second monomer may contain a hydroxyl functional group. In an embodiment, the second monomer containing a hydroxyl functional group is a hydroxyl vinyl monomer. In a further embodiment, the second monomer is selected from the group of caprolactone acrylate, and HEMA, and combinations thereof. In an even further embodiment, the second monomer is HEMA.

The styrenic polymer of the presently disclosed composition may contain any desired amounts of a second monomer. In an embodiment, the second monomer is present in the styrenic polymer composition in amounts of at least 0.1 wt %. In another embodiment, the second monomer is present in the styrenic polymer composition in amounts of at least 2.5 wt %. In yet another embodiment, the second monomer is present in the styrenic polymer composition in amounts ranging from 0.1 to 10 wt %. In a further embodiment, the second monomer is present in the styrenic polymer composition in amounts ranging from 1 to 5 wt %. In an even further embodiment, the second monomer is present in the styrenic polymer composition in amounts ranging from 2.5 to 5 wt %.

In addition to a styrenic polymer component, the presently disclosed composition may also contain polar additives. The polar additives of the presently disclosed composition may contain polar plasticizers. In an embodiment, the polar plasticizers are selected from the group of styrene-maleic anhydride polymers, poly(1,4-butylene adipate), polyethylene glycol, polyesters, and polyethers and combinations thereof. In an embodiment, the styrene-maleic anhydride (SMA) polymers include SMA® EF40 (EF40) and SMA® EF80 (EF80), which are commercially available from Sartomer Company, Inc. EF40 includes styrene-to-maleic anhydride ratios of 4:1, while EF 80 includes styrene-to-maleic anhydride ratios of 8:1. In an embodiment the styrene-to-maleic anhydride ratios can range from 1:1 to 12:1, optionally from 2:1 to 11:1, optionally from 4:1 to 10:1. In an embodiment, the polar plasticizer(s) may be present in the composition in amounts of at least 0.1 wt % based on the total weight of the composition. In another embodiment, the polar plasticizer(s) may be present in the composition in amounts ranging from 0.5 to 10 wt %. In a further embodiment, the polar plasticizer(s) may be present in the composition in amounts ranging from 1 to 5 wt %. In an even further embodiment, the polar plasticizer(s) may be present in the composition in amounts ranging from 1.5 to 2.5 wt %.

The presently disclosed composition may be prepared by co-polymerizing the first monomer with the second monomer. In an embodiment, the composition is prepared by co-polymerizing a styrenic monomer with a co-monomer containing a hydroxyl functional group. In another embodiment, the composition is prepared by co-polymerizing a styrenic monomer with a co-monomer containing a hydroxyl functional group to obtain a styrenic copolymer followed by mixing the styrenic copolymer with a polar additive. The resultant polystyrenic composition may then be sent to an extruder or other step to obtain an end use article. In another embodiment, styrene monomer is combined with a co-monomer containing a hydroxyl functional group and subsequently polymerized to form a hydroxyl polystyrene copolymer, wherein the hydroxyl polystyrene copolymer may then be combined with a polar plasticizer to form a blend, or composition. The final composition may then be sent to an extruder or other step to obtain an end use article. In a further embodiment, styrene monomer is combined with a co-monomer containing a hydroxyl functional group and a plasticizer and subsequently polymerized to form a hydroxyl polystyrene copolymer.

In an embodiment, the second monomer, or hydroxyl co-monomer, is added to the first monomer, or styrenic monomer, in amounts of at least 0.1 wt %. In another embodiment, the co-monomer is added to the styrenic monomer in amounts of at least 2.5 wt %. In another embodiment, the co-monomer is added to the styrenic monomer in amounts ranging from 0.1 to 10 wt %. In a further embodiment, the co-monomer is added to the styrenic monomer in amounts ranging from 1 to 5 wt %. In an even further embodiment, the co-monomer is added to the styrenic monomer in amounts ranging from 2.5 to 5 wt %.

The polymerization of the styrenic monomer and the co-monomer may be carried out using any method known to one having ordinary skill in the art of performing such polymerizations. In an embodiment, the polymerization may be carried out by using a polymerization initiator.

In an embodiment, the polymerization initiators include radical polymerization initiators. These radical polymerization initiators include but are not limited to perketals, hydroperoxides, peroxycarbonates and the like. In another embodiment, the polymerization initiators may be selected from the group of benzoyl peroxide, lauroyl peroxide, t-butyl peroxybenzoate, and 1,1-di-t-butylperoxy-2,4-di-t-butylcycleohexane, and combinations thereof. In an embodiment, the amount of the polymerization initiator is from 0 to 1 wt % of the monomers and co-monomers. In another embodiment, the amount of the polymerization initiator is from 0.01 to 0.5 wt % of the monomers and co-monomers. In a further embodiment, the amount of the polymerization initiator is from 0.025 to 0.05 wt % of the monomers and co-monomers.

Any process capable of processing or polymerizing styrenic monomers may be used to prepare the styrenic co-polymer of the presently disclosed composition. In an embodiment, any polymerization reaction for preparing general purpose polystyrene may be used to prepare the styrenic co-polymer of the presently disclosed composition. In an embodiment, the polymerization reaction to prepare the styrenic co-polymer may be carried out in a solution or mass polymerization process. Mass polymerization, or bulk polymerization, refers to the polymerization of a monomer in the absence of any medium other than the monomer and a catalyst or polymerization initiator. Solution polymerization refers to a polymerization process wherein the monomers and polymerization initiators are dissolved in a non-monomeric liquid solvent at the beginning of the polymerization reaction.

The polymerization may be either a batch process or a continuous process. In an embodiment, the polymerization reaction may be carried out using a continuous production process in a polymerization apparatus including a single reactor or multiple reactors. One non-limiting example of reactors and conditions for the production of a polymer composition, specifically polystyrene, are disclosed in U.S. Pat. No. 4,777,210, which is incorporated by reference herein in its entirety.

The temperature ranges useful in the polymerization process of the present disclosure can be selected to be consistent with the operational characteristics of the equipment used to perform the polymerization. In an embodiment, the polymerization temperature ranges from 90 to 240° C. In another embodiment, the polymerization temperature ranges from 100 to 180° C. In yet another embodiment, the polymerization reaction may be carried out in multiple reactors in which each reactor is operated under an optimum temperature range. For example, the polymerization reaction may be carried out in a reactor system employing a first polymerization reactor and a second polymerization reactor that may be either continuously stirred tank reactors (CSTR) or plug-flow reactors. In an embodiment, a polymerization process for the production of a styrenic co-polymer of the type disclosed herein containing multiple reactors may have the first reactor (e.g., a CSTR), also referred to as a prepolymerization reactor, operated under temperatures ranging from 90 to 135° C. while the second reactor (e.g. CSTR or plug flow) may be operated under temperatures ranging from 100 to 165° C.

In an alternative embodiment, the co-polymer may be obtained by polymerization in which heat is used as the initiator. In a further embodiment, the co-polymer may be prepared using a non-conventional initiator such as a metallocene catalyst as is disclosed in U.S. Pat. No. 6,706,827 to Lyu, et al., which is incorporated herein in its entirety by reference. In one embodiment, the first and second monomers may be admixed with a solvent and then polymerized. In another embodiment, one of the first or second monomers is dissolved in the other and then polymerized. In still another embodiment, the first and second monomers may be fed concurrently and separately to a reactor, either in a pure or unblended state or in an altered state for example dissolved in a solvent, such as mineral oil. In yet another embodiment, the second monomer may be prepared in-situ or immediately prior to the polymerization by admixing the raw material components, such as an unsaturated acid or anhydride and a metal alkoxide, in-line or in the reactor. Any process for polymerizing monomers having polymerizable unsaturation know to be useful to those of ordinary skill in the art in preparing such polymers may be used. For example, the process disclosed in U.S. Pat. No. 5,540,813 to Sosa, et al., may be used and is incorporated by reference herein in its entirety. The processes disclosed in U.S. Pat. No. 3,660,535 to Finch, et al., and U.S. Pat. No. 3,658,946 to Bronstert, et al., may be used and are both incorporated herein in their entirety. Any process suitable for preparing general purpose polystyrene may be used to prepare the styrenic co-polymer of the presently disclosed composition.

In optional embodiments, the styrenic copolymer may be admixed with additives prior to being used in end use applications. For example, the styrenic copolymer may be admixed with additives that include without limitation stabilizers, chain transfer agents, antioxidants, UV stabilizers, lubricants, plasticizers, ultra-violet screening agents, oxidants, anti-oxidants, anti-static agents, ultraviolet light absorbents, fire retardants, processing oils, mold release agents, fillers, pigments/dyes, coloring agents, and other similar compositions. Any additive known to those of ordinary skill in the art to be useful in the preparation of styrenic copolymers may be used.

In an embodiment, the presently disclosed composition has weight average molecular weights (Mw) ranging from 100,000 to 600,000 g/mol, optionally from 200,000 to 550,000 g/mol, optionally from 250,000 to 500,000 g/mol. In an embodiment, the presently disclosed composition has number average molecular weights (Mn) ranging from 10,000 to 200,000 g/mol, optionally from 80,000 to 145,000 g/mol, optionally from 115,000 to 145,000 g/mol. In an embodiment, the presently disclosed composition has z-average molecular weights (Mz) ranging from 400,000 to 1,200,000 g/mol, optionally from 500,000 to 1,150,000 g/mol, optionally from 500,000 to 600,000 g/mol.

In an embodiment, the presently disclosed composition has a polydispersity (Mw/Mn) of at least 0.5, optionally from 2.0 to 6.0, optionally from 2.4 to 4.6.

In an embodiment, the presently disclosed composition has a melt flow index (MFI) of at least 0.01 g/10 min, optionally from 0.05 to 5 g/10 min, optionally from 0.1 to 2.5 g/10 min as determined in accordance with ASTM D-1238.

In an embodiment, the presently disclosed composition has a glass transition temperature of less than 105° C. In an alternative embodiment, the presently disclosed composition has a glass transition temperature ranging from 80 to 105° C., optionally from 102 to 105° C., optionally from 103 to 104.5° C.

In an embodiment, the presently disclosed composition has an increased or higher melt strength when compared to a general purpose polystyrene (GPPS). In an alternative embodiment, the presently disclosed composition has melt strength of at least 0.01 N. In an alternative embodiment, the presently disclosed composition has a melt strength of at least 0.04 N, optionally from 0.02 to 0.12 N, optionally from 0.04 to 0.08 N. In another embodiment, the presently disclosed composition has a melt strength ranging from 0.06 to 0.1 N.

An end use article may include the presently disclosed composition. In an embodiment, the articles include films, sheets and thermoformed or foamed articles. For example, a final article may be thermoformed from a sheet containing the composition. The composition may be used in applications where high temperature performance is desirable such as microwave safe dishes and utensils. The composition may be used to form other objects such as containers and as components in automobiles, toys, and the like. In an embodiment, an article can be obtained by subjecting the polymeric composition to a plastics shaping process such as blow molding, extrusion, injection blow molding, injection stretch blow molding, thermoforming, and the like. The polymeric composition may be formed into end use articles including but not limited to: food packaging, office supplies, plastic lumber, replacement lumber, patio decking, structural supports, laminate flooring compositions, polymeric foam substrate, decorative surfaces, outdoor furniture, point-of-purchase signs and displays, house wares and consumer goods, building insulation, cosmetics packaging, outdoor replacement materials, lids and food/beverage containers, appliances, utensils, electronic components, automotive parts, enclosures, protective head gear, medical supplies, toys, golf clubs and accessories, piping, business machines and telephone components, shower heads, door handles, faucet handles, and the like.

EXAMPLES

Example 1

Hydroxyl functional polystyrene was prepared in a batch reaction process by copolymerizing styrene with hydroxyethylmethacrylate (HEMA) at varied concentrations ranging from 0 to 5 wt. % in the feed (see Table 1). The polymerization reaction was carried out in a CSTR-type batch reactor. Lupersol-233, commercially available from Arkema, Inc., was added as the initiator with an initial concentration of about 170 ppm in the reaction mixture. The reaction was run isothermally at 130° C. with continuous agitation at 150 rpm for about 3 hours or until 75% conversion was obtained. The reaction mixture was then transferred onto an aluminum pan and devolatized under active vacuum of less than 10 torr at 225° C. for 45 minutes. The reaction kinetics experienced a reaction rate increase over that of homopolymerization of styrene monomer under the same conditions, as generally expected from the reactivity ratio of (meth)acrylate-type co-monomers in styrene. Reactivity ratios of HEMA and styrene at 50° C. are $r_{HEMA}$=0.48 and $r_S$=0.27. After devolatization, the resulting material achieved adhesion to the aluminum surface of the aluminum pan.

TABLE 1

| Run No. | 1 | 2 | 3 | 4 |
|---|---|---|---|---|
| Styrene (grams) | 200 | 198 | 195 | 185.4 |
| HEMA (grams) | 0 | 2 | 5 | 10.0 |
| SMA EF-80 | 0 | 0 | 0 | 4.6 |
| HEMA (%) | 0% | 1.0% | 5.0% | 5.0% |
| TOTAL (grams) | 200 | 200 | 200 | 200 |

The concentration effect of hydroxyl groups on polystyrene properties is shown in Table 2 below. The melt index of HEMA-modified polystyrene decreased and the molecular weight of the polystyrene (especially, Mz) increased as the concentration of HEMA is increased. The addition of polar modifiers such as SMA EF80 further increases this effect, as evident from the increase in Mz value shown in FIG. 1.

TABLE 2

| HEMA wt. % | Mn/gmol$^{-1}$ | Mw/gmol$^{-1}$ | Mz/gmol$^{-1}$ | Mp/gmol$^{-1}$ | Mw/Mn | MFI/g 10 min$^{-1}$ | Tg/° C |
|---|---|---|---|---|---|---|---|
| 0.0% | 129,000 | 269,000 | 408,000 | 260,000 | 2.1 | 2.2 | 104.4 |
| 1.0% | 135,000 | 329,000 | 515,000 | 309,000 | 2.4 | 1.1 ~ 2.5 | 104.1 |
| 2.5% | 142,000 | 336,000 | 523,000 | 315,000 | 2.4 | 1.9 ~ 2.3 | 103.2 |
| 5.0% | 127,000 | 355,000 | 584,000 | 320,000 | 2.8 | 0.3 | 103.1 |
| 5.0% + EF80 (2.3%) | 106,000 | 485,000 | 1,053,000 | 299,000 | 4.6 | 0.1 | 103.4 |

Example 2

Figure 2:
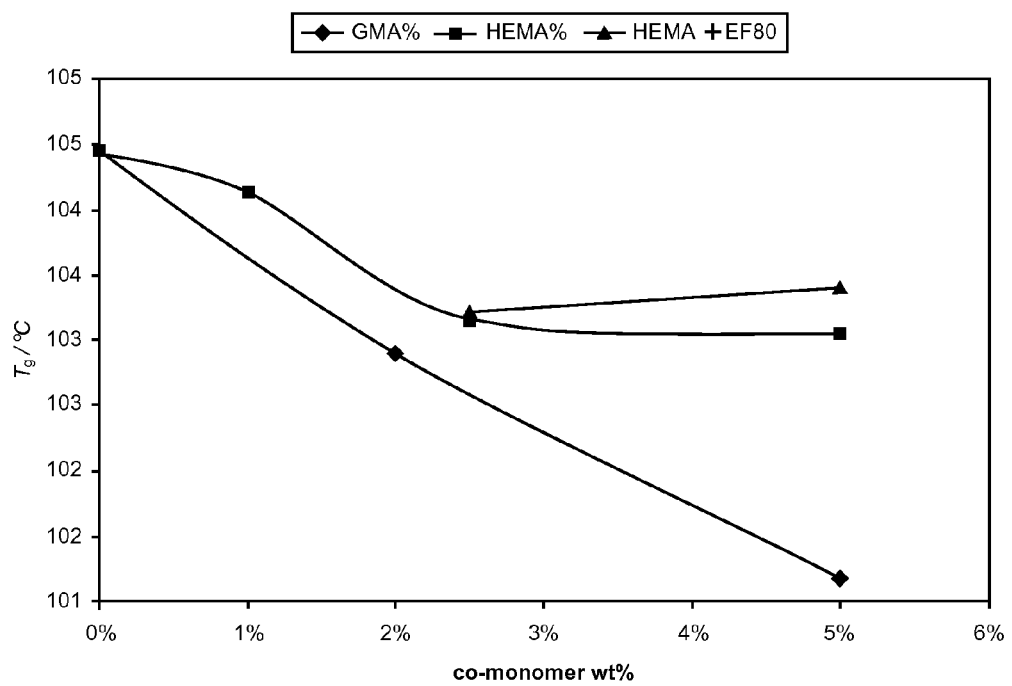
FIG. 2 is a graph illustrating the shift of glass transition temperature with comonomer concentration.

The glass transition temperature was measured for various polystyrene samples that were co-polymerized with HEMA (having a hydroxyl functional group), and glycidyl methacrylate (GMA) (not having a hydroxyl functional group), respectively, at varied concentrations. As illustrated in FIG. 2, lower glass transition temperatures were observed in both copolymers as the concentration of co-monomer increased. The drop in Tg was less significant in HEMA-modified polystyrene compared to GMA-modified, polystyrene. The addition of a polar additive (e.g., EF80) with HEMA showed to increase the Tg. This observation is consistent with the higher molecular weight (Mz at about 1.1 million) of the HEMA-modified polystyrene with the EF-80 polar additive.

Example 3

Figure 3:
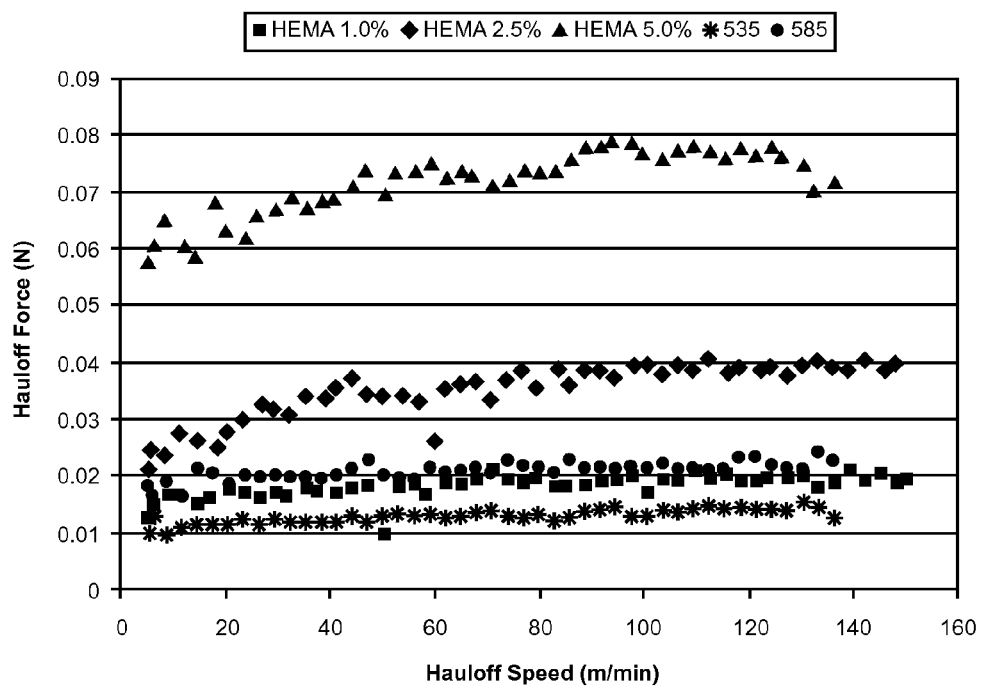
FIG. 3 is a graph depicting melt strength measurement of various HEMA-modified polystyrene samples.

Melt strength measurements were conducted on polystyrene samples containing varied concentrations of HEMA from 1 to 5 wt %. A trend was observed in FIG. 3, wherein the melt strength of the material increased along with the concentration of HEMA. The result was consistent with the observed Mz values. The melt strength of hydroxyl polystyrene was compared to those of 535 and 585 polystyrene, which are polystyrenes commercially available from Total Petrochemicals USA, Inc. At a loading of 2.5 wt % or more, the melt strength of hydroxyl functional polystyrene was higher than those of 535 and 585 polystyrene. The results indicate that the melt strength of polystyrene containing lower concentration of HEMA (1 wt %) was very similar to that of 585 polystyrene.

Figure 4:
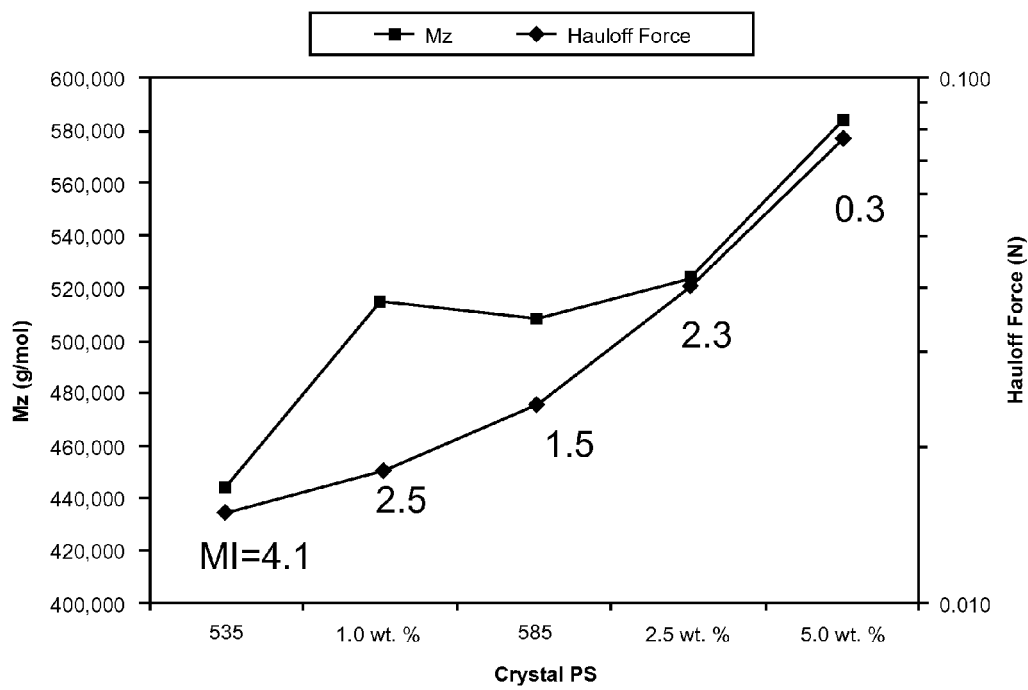
FIG. 4 is a graph comparing melt strength, Mz and melt flow of various HEMA-modified polystyrene samples.

An increase in polymer melt strength can be beneficial in a foaming process. However, the increase in melt strength cannot be at the expense of melt flow and therefore processability of the material. FIG. 4 shows that, by increasing HEMA content from 1.0 to 2.5 wt % in polystyrene, the relative increase of Mz and decrease of melt flow were insignificant in light of the relative gain of melt strength. The resulting material (2.5 wt % HEMA) had a slight higher Mz value, compared to 585, yet having a much higher melt strength. The relatively higher melt flow of the resulting material compared to 585 (2.3 vs. 1.5 g/10 min) may afford higher throughput in processing. Excess HEMA (e.g., 5 wt %) leads to a considerable decrease in melt flow despite its gain of melt strength.

Example 4

Various modified polystyrene lab samples were prepared according to the feed formulations listed in Table 3 below. For samples with feed containing SMA, the polystyrene was modified through in-situ physical blending in the reactor. All other samples were chemically modified by copolymerization. The batch conditions were the same as the conditions used in the synthesis of HEMA-modified polystyrene as discussed in Example 1.

TABLE 3

| Run No. | 0 | 1 | 2 | 3 | 4 | 5 | 6 | 7 |
|---|---|---|---|---|---|---|---|---|
| Styrene | 200 | 190 | 190 | 190 | 190 | 190 | 195 | 196.5 |
| SMA 1000P | 0 | 10 | 0 | 0 | 0 | 0 | 0 | 0 |
| SMA 3000P | 0 | 0 | 10 | 0 | 0 | 0 | 0 | 0 |
| SMA EF80 | 0 | 0 | 0 | 10 | 0 | 0 | 0 | 0 |
| Butyl Acrylate | 0 | 0 | 0 | 0 | 10 | 0 | 0 | 0 |
| Butyl MA | 0 | 0 | 0 | 0 | 0 | 10 | 0 | 0 |
| HEMA | 0 | 0 | 0 | 0 | 0 | 0 | 5 | 0 |
| MAH | 0 | 0 | 0 | 0 | 0 | 0 | 0 | 3.5 |
| TOTAL | 200 | 200 | 200 | 200 | 200 | 200 | 200 | 200 |

Various modified polystyrene samples, prepared according to the formulations listed in Table 3 above, were characterized with results shown in Table 4 below. The modifier loading in the starting material was 5 wt % except for hydroxyethylmethacrylate (HEMA), having a loading at 2.5 wt %, and maleic anhydride (MAH), having a loading at 1.75 wt %. A higher concentration (e.g., 5 wt. %) of HEMA was possible, however, the resulting polymer had an extremely low melt flow (of about 0.3 g/10 min). The loading of MAH was largely limited by its solubility in styrene. Even with 3.5 wt. %, the MAH was not fully dissolved and the resulting polymer was semi-transparent. The solubility issue was also observed with styrene-maleic anhydride SMA® resins, 1000P and 3000P, each commercially available from Cray Valley SA, where styrene-to-maleic anhydride ratio was 1:1 and 3:1, respectively.

Thermal analysis of modified polystyrene shows the glass transition temperature (Tg) of polystyrene was maintained at about 105° C. after in-situ reactor blending with various SMAs. For SMA® 1000P and SMA® 3000P, the miscibility issue and apparent phase separation did not seem to change the Tg of polystyrene. SMA® EF80, commercially available from Cray Valley SA was fully soluble in polystyrene but had a reported glass transition at 104° C., similar to polystyrene. The polystyrene modified with EF80 did not show a shift in Tg. A lowering of the glass transition temperature was observed for polystyrene copolymerized with butyl acrylate, butyl methacrylate, as well as HEMA.

Also shown in Table 4, the melt flow of modified polystyrene increased when compared to un-modified polystyrene. The exception was with HEMA modified polystyrene. The interaction of hydroxyl groups, including hydrogen bonding, can form a cross-linked network in polystyrene, resulting in higher viscosity and resistance to flow, which was confirmed by an upward surge of Mz with relatively unchanged Mn and Mw values.

TABLE 4

| Modifier | None | SMA 1000P | SMA 3000P | SMA EF80 | Butyl Acrylate | Butyl Methacrylate | HEMA | MAH | MAH |
|---|---|---|---|---|---|---|---|---|---|
| Wt % | 0 | 5.0 | 5.0 | 5.0 | 5.0 | 5.0 | 2.5 | 1.75 | 3.5 |
| Mol[a]/100 g | 0 | 0.025 | 0.012 | 0.005 | 0.039 | 0.035 | 0.019 | 0.018 | 0.036 |
| Transparency | Clear | Opaque | Opaque | Clear | Clear | Clear | Clear | Clear | Semi-Clear |
| $Tg_1/°$ C. | 105.2 | 104.8 | 104.5 | 104.4 | 94.8 | 98.2 | 102.6 | 105.0 | 104.0 |
| $Tg_2/°$ C. | n/a | 169.3 | n/a | n/a | n/a | n/a | n/a | n/a | n/a |
| MFI/g · 10 $min^{-1}$ | 2.1 | 2.2 | 2.8 | 2.9 | 3.3 | 2.9 | 1.7 | 2.2 | 3.3 |
| Mn/g · $mol^{-1}$ | 130,000 | 138,000 | 132,000 | 84,100 | 136,000 | 122,000 | 128,000 | 115,000 | 97,300 |
| Mw/g · $mol^{-1}$ | 271,000 | 273,000 | 269,000 | 262,000 | 284,000 | 260,000 | 312,000 | 250,000 | 220,000 |
| Mz/g · $mol^{-1}$ | 415,000 | 439,000 | 418,000 | 417,000 | 433,000 | 398,000 | 529,000 | 391,000 | 350,000 |
| Mp/g · $mol^{-1}$ | 259,000 | 255,000 | 259,000 | 265,000 | 271,000 | 250,000 | 270,000 | 239,000 | 212,000 |
| Mw/Mn | 2.1 | 2.0 | 2.0 | 3.1 | 2.1 | 2.1 | 2.4 | 2.2 | 2.3 |

[a]number of moles of modifier per 100 g of polymer.

Example 5

Batch reactions were run to incorporate varied amounts of 0, 1, 2.5 and 5 wt % of caprolactone acrylate into polystyrene, according to the formulations shown in Table 5. The batch run conditions were the same as those for HEMA-modified polystyrene in Example 1. The resulting polystyrene had a tendency to climb the stir shaft and the reaction had to be stopped at a conversion of 50%. Similar phenomenon was observed with 2.5 wt % caprolactone acrylate, but to a lesser extent. The reaction continued to finish at 62% conversion. In contrast, no such reaction issues were observed with HEMA as the co-monomer.

TABLE 5

| Run No. | 1 | 2 | 3 | 4 |
|---|---|---|---|---|
| Styrene (g) | 200 | 198 | 195 | 190 |
| Caprolactone (g) | 0 | 2 | 5 | 10 |
| Caprolactone (wt %) | 0.0% | 1.0% | 2.5% | 5.0% |
| TOTAL | 200 | 200 | 200 | 200 |

The structure of caprolactone acrylate, as shown in Formula I below, has a long alkyl/ester chain which can extend hydroxyl functionality away from the vinyl group where polymerization with styrene occurs. The extended (having greater than 14 carbon atoms) hydroxyl groups may afford more efficient interaction than HEMA where —OH groups are extended through a short ethyl linker. In copolymers, the hydroxyl functionality in HEMA is structurally close to the backbone and may be hidden in the entanglement of styrenic chains. The more efficient interaction from caprolactone may help reduce the amount of co-monomer needed for polystyrene modification.

Formula 1—Caprolactone

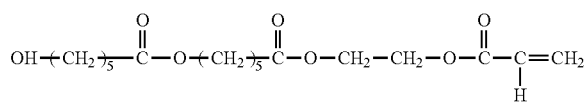

The polystyrene copolymer with caprolactone had much higher Mw and Mz values than HEMA copolymers at the same loading, despite their similar Mn values as shown in Table 6. The values of Mw and Mz trend with the concentration of caprolactone co-monomer, but drop at a loading of 5 wt %. With 5 wt % caprolactone, the reaction was terminated before it could go to completion.

TABLE 6

| | Caprolactone | | | HEMA | | |
|---|---|---|---|---|---|---|
| Loading (wt %) | 1.0 | 2.5 | 5.0 | 1.0 | 2.5 | 5.0 |
| $Mn/g \cdot mol^{-1}$ | 142,000 | 139,000 | 86,9000 | 135,000 | 142,000 | 127,000 |
| $Mw/g \cdot mol^{-1}$ | 426,000 | 522,000 | 280,000 | 329,000 | 336,000 | 355,000 |
| $Mz/g \cdot mol^{-1}$ | 860,000 | 1,144,000 | 639,000 | 515,000 | 523,000 | 584,000 |
| $Mp/g \cdot mol^{-1}$ | 269,000 | 248,000 | 176,000 | 309,000 | 315,000 | 320,000 |
| Mw/Mn | 3.0 | 3.8 | 3.2 | 2.4 | 2.4 | 2.8 |

Figure 5:
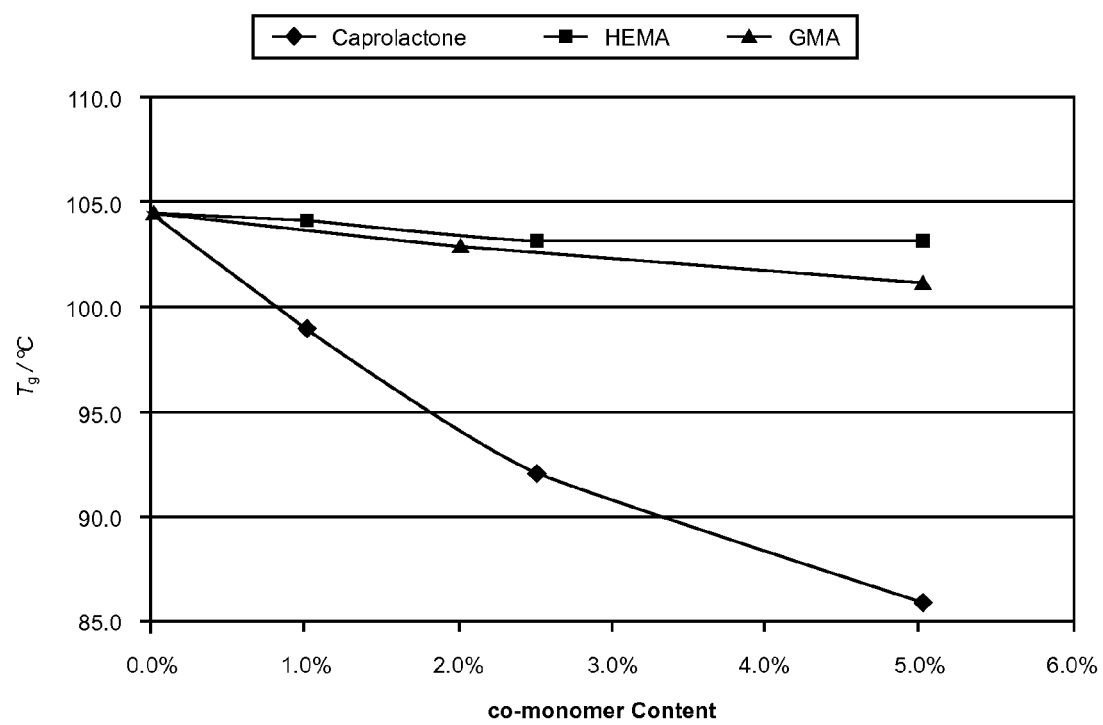
FIG. 5 is a graph illustrating the glass transition temperature of caprolactone functional polystyrene in various amounts in comparison to various amounts of HEMA-modified polystyrene and glycidyl methacrylate (GMA)-modified polystyrene.

Despite its efficient hydroxyl interaction, the thermal analysis of caprolactone functional polystyrene showed a decrease in the glass transition temperature with concentration (see FIG. 5). For caprolactone the drop in Tg was greater than the drop observed with HEMA or GMA at a similar loading.

Figure 6:
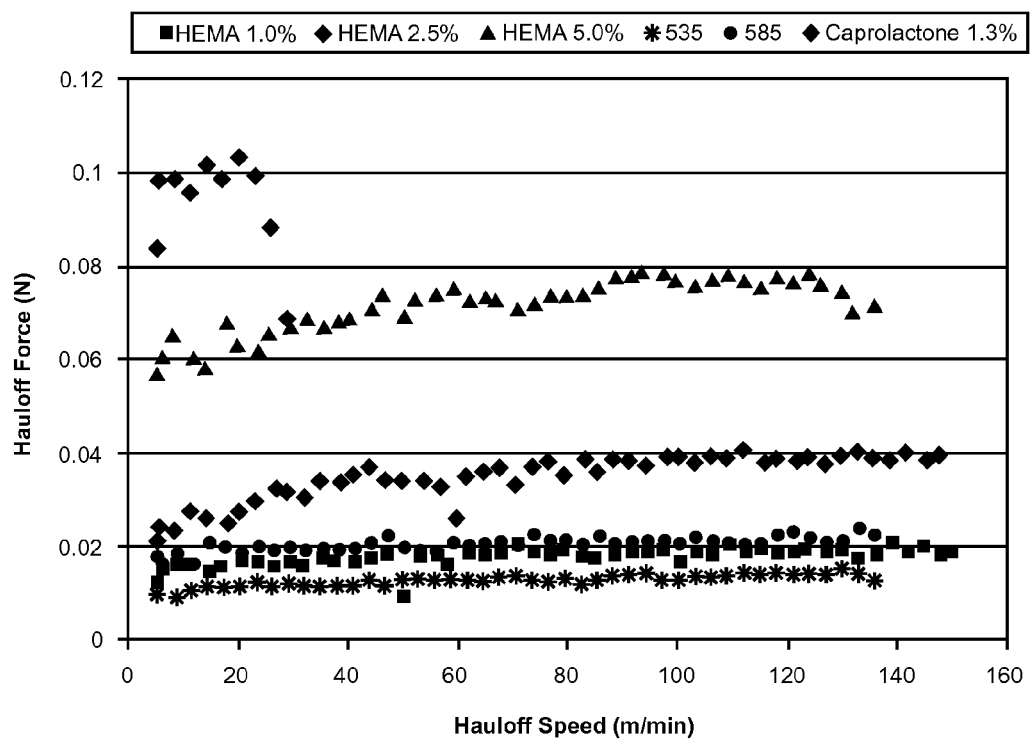
FIG. 6 is a graph depicting melt strength measurement of a caprolactone functional polystyrene in comparison with various HEMA-modified polystyrene samples.

The melt strength of caprolactone functional polystyrene was also tested. The results are shown in FIG. 6 as compared to unmodified polystyrene and to HEMA-modified polystyrene. At a loading of only 1.3 wt %, the initial melt strength at low speed was higher than HEMA-modified polystyrene at 5 wt %.

As used herein, the term "monomer" refers to a relatively simple compound, usually containing carbon and of low molecular weight, which can react by combining one or more similar compounds with itself to produce a polymer.

As used herein, the term "co-monomer" refers to a monomer which is copolymerized with at least one different monomer in a copolymerization reaction resulting in a copolymer.

As used herein, the term "homopolymer" refers to a polymer resulting from polymerization of a single monomer species.

As used herein, the term "co-polymer," also known as a "heteropolymer," is a polymer resulting from polymerization of two or more monomer species.

As used herein, the term "copolymerization" refers to the simultaneous polymerization of two or more monomer species.

As used herein, the term "polymer" generally includes, but is not limited to homopolymers, co-polymers, such as, for example, block, graft, random and alternating copolymers, and combinations and modifications thereof.

It is to be understood that while illustrative embodiments have been depicted and described, modifications thereof can be made by one skilled in the art without departing from the spirit and scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

Use of the term "optionally" with respect to any element of a claim is intended to mean that the subject element is required, or optionally, is not required. Both alternatives are intended to be within the scope of the claim. Use of broader terms such as comprises, includes, having, etc. should be understood to provide support for narrower terms such as consisting of, consisting essentially of, comprised substantially of, etc.

Depending on the context, all references herein to the "invention" may in some cases refer to certain specific embodiments only. In other cases it may refer to subject matter recited in one or more, but not necessarily all, of the claims. While the foregoing is directed to embodiments, versions and examples of the present invention, which are included to enable a person of ordinary skill in the art to make and use the inventions when the information in this patent is combined with available information and technology, the inventions are not limited to only these particular embodiments, versions and examples. Also, it is within the scope of this disclosure that the embodiments disclosed herein are usable and combinable with every other embodiment disclosed herein, and consequently, this disclosure is enabling for any and all combinations of the embodiments disclosed herein. Other and further embodiments, versions and examples of the invention may be devised without departing from the basic scope thereof and the scope thereof is determined by the claims that follow.

What is claimed is:

1. A composition comprising:
    a co-polymer resulting from the polymerization of a combined mixture of least one first monomer that is a monovinylaromatic compound and at least one comonomer;
    a polar additive admixed with the co-polymer, wherein the polar additive is present in amounts ranging from 0.1 to 5 wt % based on a total weight of the composition;
    wherein the at least one comonomer contains a hydroxyl functional group;
    wherein the co-polymer has a melt strength of at least 0.04 N.

2. The composition of claim 1, wherein the comonomer is selected from the group consisting of hydroxyethylmethacrylate (HEMA), caprolactone acrylate, and combinations thereof.

3. The composition of claim 1, wherein the comonomer is present in the combined mixture in amounts ranging from 0.1 to 10 wt % based on the total weight of the combined mixture.

4. The composition of claim 1, wherein the first monomer is present in the combined mixture in amounts ranging from 50 to 99.9 wt % based on the total weight of the combined mixture.

5. The composition of claim 1, wherein the first monomer is selected from the group consisting of styrene, α-methyl styrene, vinyl toluene, p-methyl styrene, t-butyl styrene, o-chlorostyrene, and vinyl pyridine and any combinations thereof.

6. The composition of claim 1, further comprising a z-average molecular weight ranging from 500,000 to 1,150,000.

7. The composition of claim 1, wherein the polar additive is selected from the group consisting of styrene-maleic anhydride polymers, poly(1,4-butylene adipate), polyethylene glycol, polyesters, polyethers, and combinations thereof.

8. An article of manufacture made with the composition of claim 1.

9. A composition comprising:
    a co-polymer resulting from the polymerization of a combined mixture of least one first monomer and at least one comonomer;
    a polar additive in amounts ranging from 0.1 to 5 wt % based on the total weight of the composition that is admixed with the co-polymer
    wherein the polar additive is selected from the group consisting of styrene-maleic anhydride polymers, poly(1,4-butylene adipate), polyethylene glycol, polyesters, polyethers, and combinations thereof;
    wherein the co-polymer has a melt strength of at least 0.04 N;
    wherein the first monomer is selected from the group consisting of styrene, α-methyl styrene, vinyl toluene, p-methyl styrene, t-butyl styrene, o-chlorostyrene, and vinyl pyridine and any combinations thereof; and
    wherein the at least one comonomer contains a hydroxyl functional group and is selected from the group consisting of hydroxyethylmethacrylate (HEMA), caprolactone acrylate, and combinations thereof and the comonomer is present in the combined mixture in amounts ranging from 0.1 to 10 wt % based on the total weight of the combined mixture.

10. A method of improving the melt strength of a polymer, comprising:
    combining a first monomer that is a monovinylaromatic compound and a comonomer having a hydroxyl functional group to form a combined mixture; and
    subjecting the combined mixture to polymerization to obtain a co-polymer;
    admixing a polar additive with the co-polymer to form a composition;
    wherein the polar additive is present in the composition in amounts ranging from 0.1 to 5 wt % based on the total weight of the composition;
    wherein the comonomer having a hydroxyl functional group is present in amounts of at least 0.1 wt % based on the total weight of the combined mixture, to provide the co-polymer a melt strength of at least 0.03 N; and
    wherein the co-polymer comprises a glass transition temperature of less than 105° C.

11. The method of claim 10, wherein the first monomer is selected from the group consisting of styrene, α-methyl styrene, vinyl toluene, p-methyl styrene, t-butyl styrene, o-chlorostyrene, and vinyl pyridine and any combinations thereof.

12. The method of claim 10, wherein the comonomer is selected from the group consisting of hydroxyethylmethacrylate (HEMA), caprolactone acrylate, and combinations thereof.

13. The method of claim 10, wherein the comonomer is added to the combined mixture in amounts ranging from 0.1 to 10 wt % based on the total weight of the combined mixture.

14. The method of claim 10, wherein the first monomer is present in the combined mixture in amounts ranging from 50 to 99.9 wt % based on the total weight of the combined mixture.

15. The method of claim 10, wherein the polar additive is selected from the group consisting of styrene-maleic anhydride polymers, poly(1,4-butylene adipate), polyethylene glycol, polyesters, polyethers, and combinations thereof.

* * * * *